Oct. 5, 1954  W. H. SILVER ET AL  2,690,622
PLOW AND CONVEYER ADJUSTMENT FOR TERRACING MACHINES
Filed Nov. 25, 1949  4 Sheets-Sheet 1
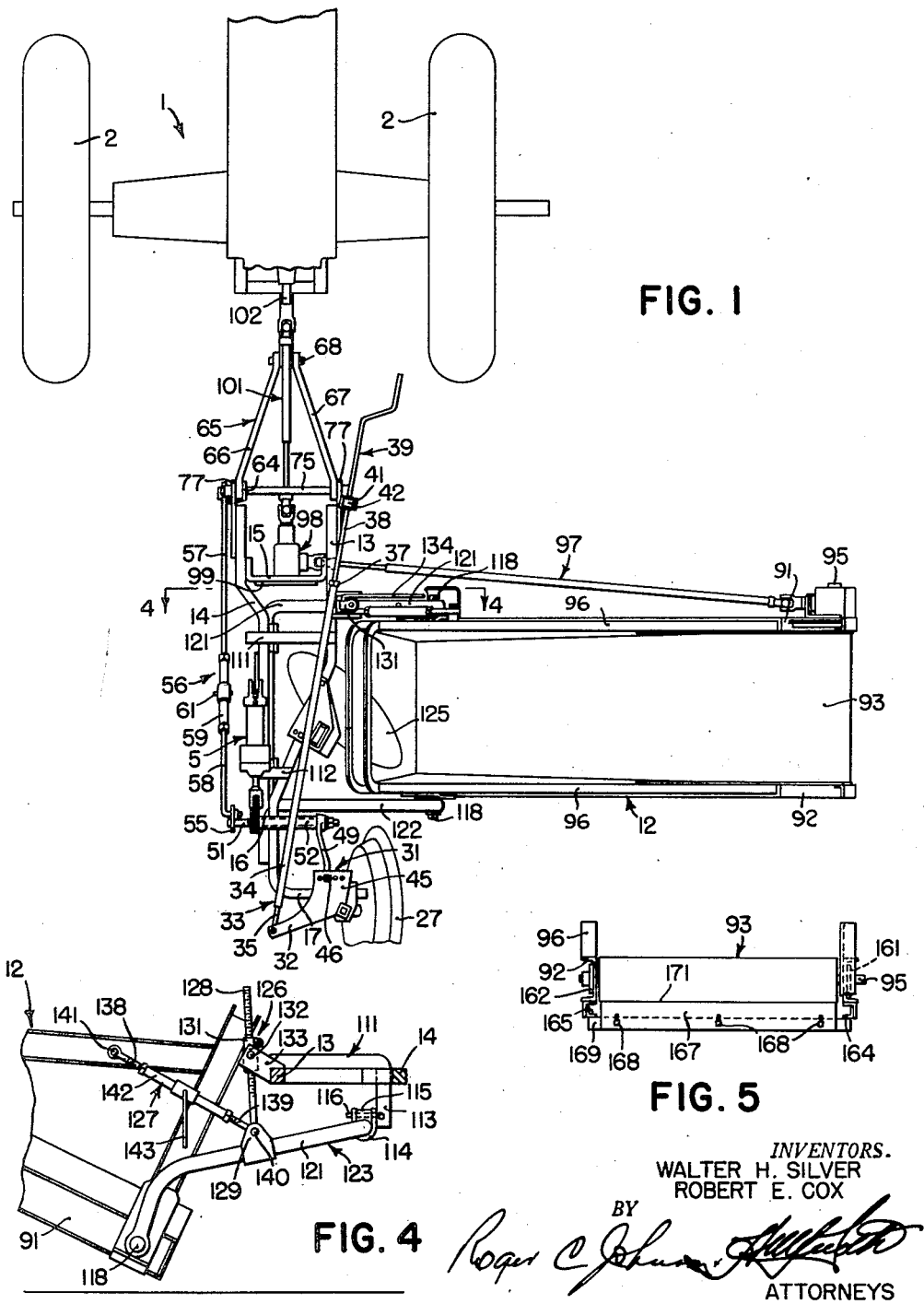
FIG. 1
FIG. 5
FIG. 4
INVENTORS.
WALTER H. SILVER
ROBERT E. COX
BY
ATTORNEYS Oct. 5, 1954     W. H. SILVER ET AL     2,690,622
PLOW AND CONVEYER ADJUSTMENT FOR TERRACING MACHINES
Filed Nov. 25, 1949     4 Sheets-Sheet 2
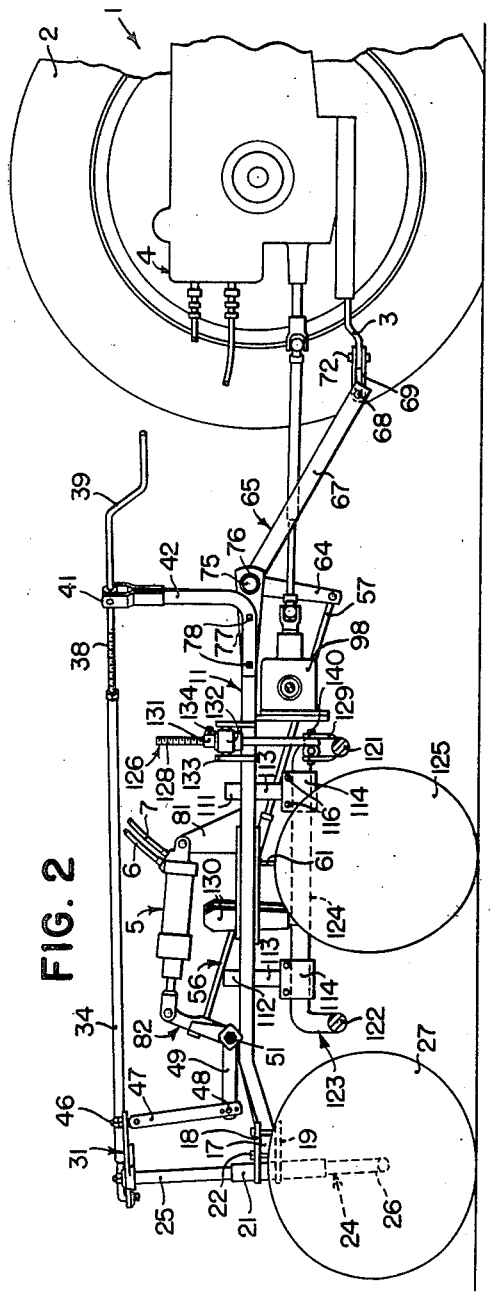
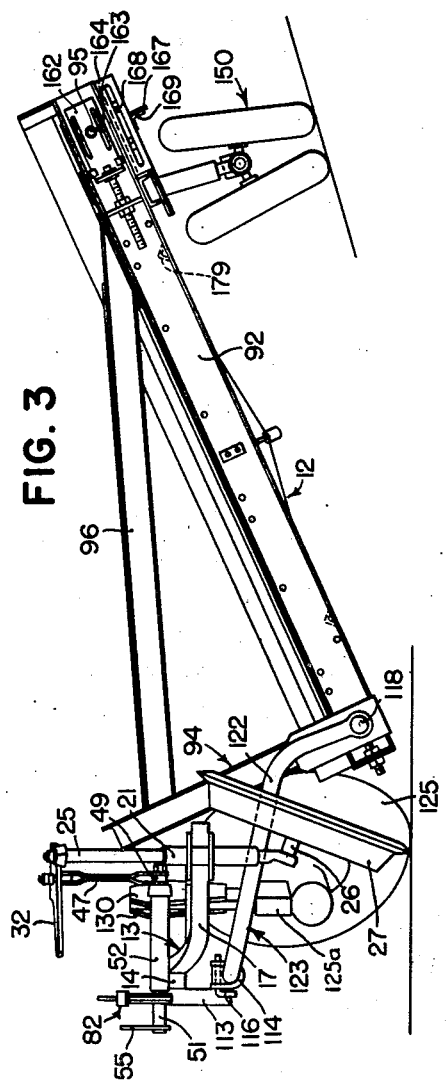
INVENTORS.
WALTER H. SILVER
ROBERT E. COX
BY
ATTORNEYS Oct. 5, 1954   W. H. SILVER ET AL   2,690,622
PLOW AND CONVEYER ADJUSTMENT FOR TERRACING MACHINES
Filed Nov. 25, 1949   4 Sheets-Sheet 3

INVENTORS.
WALTER H. SILVER
ROBERT E. COX
BY
ATTORNEYS

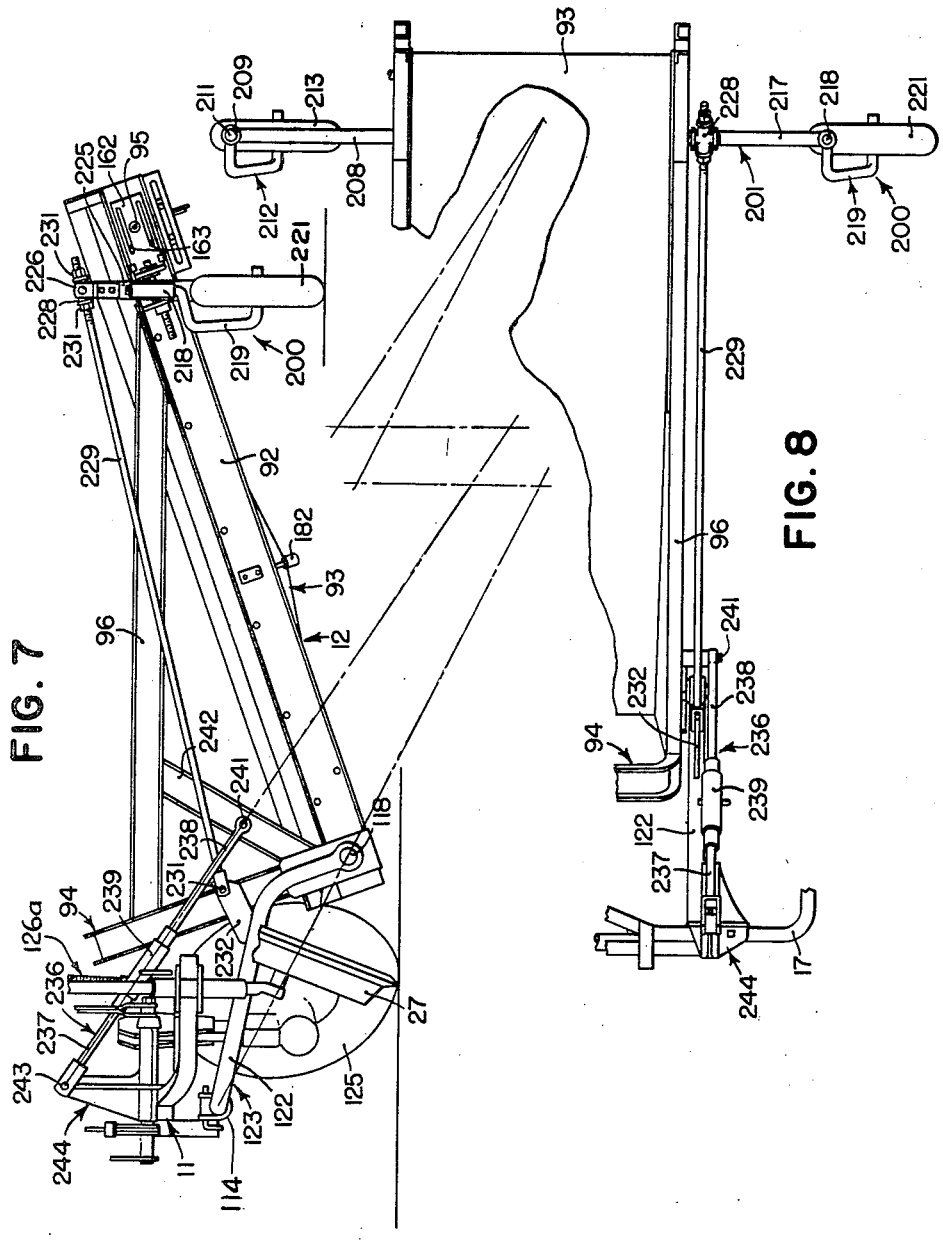

Patented Oct. 5, 1954

2,690,622

UNITED STATES PATENT OFFICE 2,690,622

PLOW AND CONVEYER ADJUSTMENT FOR TERRACING MACHINES

Walter H. Silver and Robert E. Cox, Moline, Ill., assignor to Deere & Company, Moline, Ill., a corporation of Illinois Application November 25, 1949, Serial No. 129,354

8 Claims. (Cl. 37—110)

1

The present invention relates generally to agricultural machines and more particularly to machines for forming terraces and the like.

The object and general nature of the present invention is the provision of a terracing machine of the semi-integral type, that is, one in which the forward portion of the machine is supported on the propelling tractor and the rear portion is supported on ground wheels or the like in towed or trailing relation. More particularly, it is a feature of this invention to provide a plow frame for supporting the plow element for loosening and removing portions of the soil and a laterally extending conveyor frame carrying a conveyor in a position to receive the soil from the plow element, with means for rigidly connecting the conveyor frame to the plow frame whereby the ground support at the outer end of the conveyor frame serves to stabilize the plow frame and prevent any tipping of the latter about a generally fore and aft extending axis. Further, it is a feature of this invention to provide a rear furrow wheel at the rear portion of the plow frame with means for raising and lowering the rear end of the plow frame relative to the rear furrow wheel, in conjunction with a generally vertically extending hitch structure connected to the forward end of the plow frame and at its forward end connected with the tractor to be supported thereby, the hitch structure being adjustably interconnected with the rear furrow wheel raising and lowering means, whereby raising and lowering the plow frame relative to the tractor and the rear furrow wheel serves to lift both frames generally about the conveyor ground wheel means as a fulcrum and raising and lowering the plow element into and out of transport position out of contact with the ground. Further, according to the principles of the present invention, the means for rigidly connecting the conveyor frame to the plow frame is adjustable to provide for leveling the conveyor and/or raising and lowering the latter relative to the plow element.

Still further, another feature of the present invention relates to new and improved means for removing soil adhering to or caught within the conveyor belt, especially when operating under conditions in which the soil is moist and sticky and tends to adhere to the conveyor belt.

These and other objects and advantages of the present invention will be apparent to those skilled in the art after a consideration of the following detailed description, taken in conjunction with the accompanying drawings.

In the drawings:

Figure 1 is a plan view of one form of the present invention;

Figure 2 is a side view of the form of the invention shown in Figure 1;

Figure 3 is a rear view of the invention shown in Figure 1;

Figure 4 is a fragmentary view showing one form of the conveyor adjusting means;

Figure 5 is a fragmentary view of the outer end of the conveyor unit;

Figure 7 is a rear view of a modified form of the present invention;

Figure 8 is a fragmentary plan view of the form of the invention shown in Figure 7;

Figure 9:
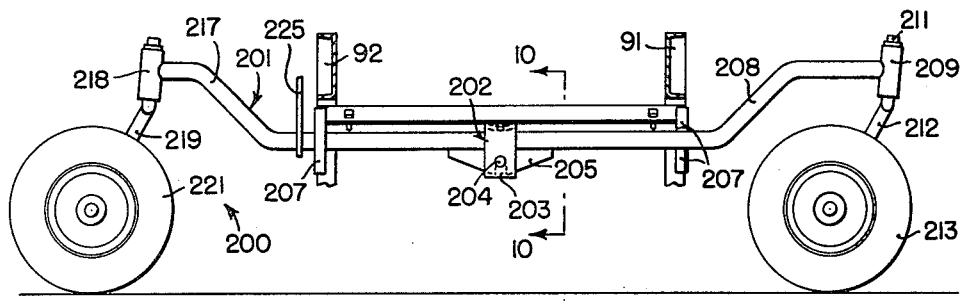
Figure 9 is an end view of the conveyor unit and its supporting wheel means.
Figure 10:
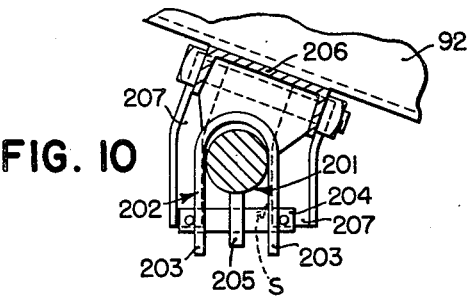
Figure 10 is a sectional view taken along the line 10—10 of Figure 9.

Referring now to the drawings, the terracing machine of the present invention is shown as connected to a tractor 1 of conventional construction, so far as the present invention is concerned, embodying drive wheels 2, a drawbar 3 and a power lift unit 4 (Figure 2) including means for controlling flow of fluid under pressure to and from opposite ends of a power lift cylinder 5 through hose lines 6 and 7. The hose lines 6 and 7 are of sufficient length to provide for attachment of the power lift cylinder 5 to many different kinds of implements of which the terracing machine of the present invention is only one.

The terracing machine of the present invention embodies a plow frame 11 and a conveyor frame 12 normally connected together in rigid relationship. The plow frame 11 comprises a pair of laterally spaced frame bars 13 and 14 connected together at their forward ends by a crossbar 15, the rear portions of the frame bars extending in converging relationship and welded together, as indicated at 16. The inner frame bar 13 is extended rearwardly beyond the outer frame bar 14 and is bent downwardly and then laterally to the right, as indicated at 17, receiving a pair of clamp plates 18 and 19 to which a vertical sleeve member 21 is connected, as by welding. The plates 18 and 19 are fastened securely to the frame bar section 17 by a plurality of clamping bolts 22. A furrow wheel axle 24 includes a spindle section 25 and a lower angled section 26 on which a rear furrow wheel 27 is journaled. The spindle section 25 is slidable generally vertically within the sleeve 21 and at its upper end carries a sector 31, preferably in the form of an arm or lever, which is secured to the upper end of the spindle section 25 by any suitable means, the sector 31 having a first arm portion 32 apertured to receive the rear end of an adjusting link 33. The latter member includes a rear pipe section 34 to the rear end of which a rod section 35 is secured, the latter section having an upwardly turned end which is connected into an aperture in the sector arm 32. The forward end of the pipe section 34 carries a nut section 37 in which the screw-threaded portion 38 of an adjusting crank member 39 is received. The crank member 39 is held against axial movement within a swivel 41 that is rockably carried at the upper end of a standard 42 fixed in any suitable way to the forward end of the right-hand frame member 13. The sector 31 includes a second arm section 45 which is provided with a plurality of apertures in any one of which an eyebolt 46 may be connected. The lower end of the eyebolt receives the upper end of a link 47, the lower end of which is provided with a plurality of apertures in any one pair of which a pivot pin 48 may be disposed. The pin 48 is carried by an arm 49 which is secured to the right end of a rockshaft 51 which is journaled in a transverse sleeve member 52 that is welded to the rear portion of the right-hand frame bar 13. Secured to the left-hand end of the rockshaft 51 is a second arm 55 to which the rear end of an adjustable link member 56 is pivoted. The link member 56 comprises front and rear sections 57 and 58 interconnected by a turnbuckle arrangement 59 carrying a swingably mounted operating arm 61. The front end of the link member 56 is connected to the lower end of a depending arm 64 that is connected rigidly to and forms a part of a hitch structure indicated in its entirety by the reference numeral 65. The hitch structure comprises forwardly diverging, laterally spaced-apart bars 66 and 67 connected together at their forward converging ends by a cross pin 68 which receives a clevis 69 that is connected by a hitch pin 72 to the drawbar 3 of the tractor that propels and powers the machine. The rear ends of the hitch bars 66 and 67 are rigidly interconnected, as by being welded to a crossbar 75 which has its ends rockably supported in bearing sections 76 carried by supporting bracket plates 77 that are bolted as at 78 to the forward ends of the frame bars 13 and 14. The arm 64 mentioned above is secured as by welding to the left end of the shaft 75 or to the rear end of the left-hand hitch bar 67, as desired. As will be readily apparent from Figure 2, by virtue of the construction just described, the front end of the hitch member 65 and the spindle section 25 of the furrow wheel construction may be simultaneously raised or lowered relative to the plow frame 11 by operation of the rockshaft 51.

The power cylinder 5 is adapted to be mounted on the plow frame 11 and connected with the rockshaft 51 so as to operate the latter by power derived from the tractor motor, and to this end, the generally central portion of the left-hand frame bar 14 is provided with a generally upwardly extending bracket 81 welded at its lower portion to the frame bar 14 and apertured at its upper end to receive a pivot pin of the power cylinder 5. The other or piston section of the power cylinder 5 is connected through arm means 82 to the rockshaft 51, whereby the latter may be operated at will by power derived from the tractor.

The laterally outwardly extending conveyor frame 12 comprises front and rear channel members 91 and 92 which carry suitable rollers upon which a conveyor in the form of belt 93 is supported. The channels 91 and 92 are interconnected at their inner ends by a yoke 94 formed of channel iron and reenforced by braces 96. One of the rollers, preferably the one at the outer end of the conveyor frame 12, is driven by power derived from the tractor motor. To this end, the laterally outermost roller, the shaft of which is indicated at 95 (Figure 1) is actuated by a bevel gear set from the outer end of a power shaft construction 97, which may be of any suitable or conventional construction, the inner end of the power shaft 97 being driven from a second bevel gear set 98 fixed to a plate 99 that is secured as by welding to the plow frame bars 13 and 14. A power take-off shaft construction 101 is connected at its rear end to drive the gear set 98 and at its forward end is connected to the power take-off shaft 102 of the tractor. The power shaft constructions 97 and 101 include the usual universal joints and telescopic shaft sections so as to provide for movement not only of the entire machine relative to the tractor but also movement of the conveyor frame 12 and associated parts relative to the plow frame 11 and the gear set 98 carried by the latter.

The conveyor frame 12 is adapted to be connected rigidly but adjustably at its inner end to the plow frame 11, and for this purpose the plow frame 11 is provided with a pair of heavy brackets, preferably in the form of L-shaped bars 111 and 112, each including a depending section 113 to which bail-receiving socket members 114 are connected. Each socket member 114 comprises a generally U-shaped member having its open portion extending upwardly but adapted to be closed by a bearing block 115 held in place by a pair of removable pins 116. The inner end of the conveyor frame 12 is provided with front and rear studs 118 which receive the front and rear arms sections 121 and 122 of a bail member 123, a central section 124 of which is adapted to be seated in and supported by the socket members 114 mentioned above. The bail member 123 is a rigid structure and serves to connect the conveyor frame 12 to the plow frame 11 so as to prevent twisting of the conveyor frame about a generally transverse axis relative to the plow frame 11. However, the conveyor frame 12 may swing upwardly or downwardly relative to the side arm portions 121 and 122 of the bail member 123, and similarly, by virtue of the seating of the central portion 124 in the socket members 114, the bail member 123 may be swung upwardly or downwardly relative to the plow frame 11, all for the purpose of adjusting the position of the inner end of the conveyor frame relative to the plow frame, particularly with reference to a soil excavating plow element in the form of a disk 125 mounted for rotation by suitable bearing means on the lower end of a disk standard 125a, the upper end of which is rigidly fixed to the plow frame 11 by any suitable means, such as bracket plates 130.

The means for adjusting the position of the inner end of the conveyor frame 12 relative to the plow frame 11 and for rigidly interconnecting the two frames preferably comprises two crank screw devices indicated at 126 and 127 respectively. The adjusting device 126 comprises a screw threaded rod 128 pivotally connected at its lower end to a bracket 129 fixed to the forward side arm 121 of the bail member 123 and a screw-threaded nut member 131 which is carried by a swivel 132 rockably mounted in a pair of brackets 133 (Figures 2 and 4) welded to the right-hand frame bar 13. An operating rod or crank 134 is pivoted to the upper portion of the nut member 131 for the purpose of turning the latter when desired. The other crank screw adjusting unit 127 includes a pair of screw-threaded rod members 138 and 139 (Figure 4), the section 138 being pivoted to a stud 141 on the conveyor frame 12 and the other section 139 being pivoted to a pin 140 or the like carried by the bracket 129, preferably the same pin that receives the lower end of the screw-threaded member 128 mentioned above. The two screw-threaded sections 138 and 139 are interconnected by a turnbuckle arrangement 142 which carries a rod or operating member 143. By simultaneously turning the turnbuckle 142 and the nut member 131, the position of the inner end of the conveyor frame 12, which at all times is rigidly connected with the plow frame 11 through the crank-screw adjusting units mentioned above, may be varied, as desired, principally for the purpose of bringing the inner or receiving end of the conveyor belt 93 to the proper position relative to the plow disk 125. The outer end of the conveyor frame 12 is carried on a ground wheel unit 150 positioned generally laterally opposite the rear furrow wheel 27 which receives the rear end of the plow frame 11 as described above.

Since the power unit 5 ordinarily holds the cross shaft 51 against movement, the hitch construction 65, connected to the shaft 51 by the link means 56, is likewise held against movement relative to the plow frame 11. Therefore, the terracing machine as a whole is supported by the two ground wheel means 27 and 150 and, at its front end, on the tractor through the hitch connection 72. The position of the plow disk 125 relative to the ground is varied, as desired, or the plow element 125 may be raised into a transport position by suitable operation of the power cylinder 5 which serves to raise and lower the plow frame 11 relative to the rear furrow wheel 27 and relative to the drawbar 3 of the tractor by virtue of the vertical swinging of the hitch construction 65 simultaneously with the raising and lowering of the plow frame 11 along the rear furrow wheel spindle 25.

In order to maintain proper tension in the conveyor belt 93, the laterally outer roller shaft 95 is carried on a pair of brackets 161 and 162 which are adjustable relative to the outer ends of the conveyor frame channels 91 and 92. The brackets 161 and 162 are fixed in any position of adjustment by bolt and slot means, indicated generally by the reference numeral 163. Secured to the lower portions of the brackets 161 and 162 are front and rear auxiliary brackets 164 and 165 on which a scraper plate 167 is fixed, as by bolt and slot means 168 carried by a cross angle 169 which serves to receive the plate 167 and which at its ends is fixed to the auxiliary brackets 164 and 165. The plate 167 has an upper soil-scraping edge 171 which is maintained in closely spaced relation with respect to the conveyor belt 93 where it passes around the lower portion of the outer driving roller and serves to remove any soil or the like that tends to adhere to the belt 93.

Figure 6:
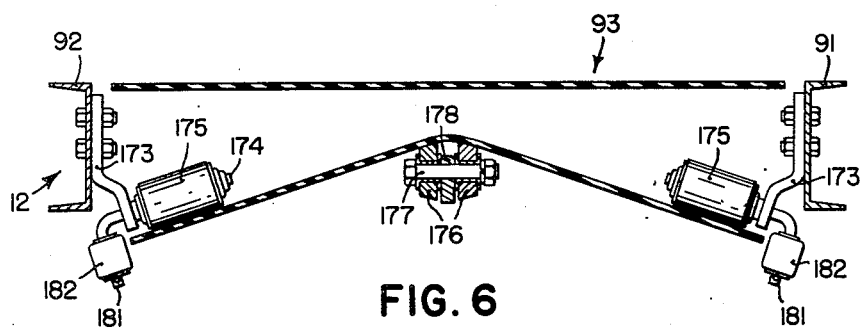
Figure 6 is a sectional view showing the preferred form of means for removing soil from inside the conveyor belt.

As best shown in Figure 6, any soil that leaks or filters into the space between the upper and lower runs of the belt is discharged therefrom by virtue of means now to be described, which deflects the front and rear side portions of the lower run or flight of the belt 93 downwardly so as to permit any soil in said space to move outwardly therefrom. A pair of brackets 173 are fixed to the front and rear channels of the conveyor frame 12 and include or support inner axle portions 174 which are disposed at an angle to the plane of operation of the belt 93. The axle portions 174 carry rollers 175 which lie above the lower run or flight of the belt 93 and cooperate with a pair of inner rollers 176 to cause the side portions to be deflected downwardly, thereby forming the central portion of the lower flight of the belt into a convex section whereby soil and the like flows away from the inside of the belt. The rollers 176 are mounted on an axle 177 fixed to a supporting bar 178, and the latter is disposed longitudinally of the conveyor frame 12 and fixed to the latter by a pair of cross bars 179 (Figure 3) to which the ends of the bar 178 are welded. The axle portions 174 are formed at their ends with downwardly extending sections 181 carrying rollers 182 which engage the edges of the lower flight of the belt, holding the same in proper position laterally of the frame 12.

A modified form of the present invention is shown in Figures 7–9, and referring to these figures it will be noted that this form of the invention employs many parts which are common with the implement shown in Figures 1–6 and described above. Accordingly, for those parts which are common the same reference numerals appearing in the description above will be employed in connection with the description of the form of the invention shown in Figures 7–9.

In the modified form of the invention the outer end of the conveyor frame 12 is carried on a caster wheel unit indicated in its entirety by the reference numeral 200. The caster wheel unit 200 includes a fore and aft extending frame member 201 which is rockably connected to the outer end of the conveyor frame 12 by a centrally disposed bracket 202 having lugs 203 which are apertured to receive a hinge pin 204 which, in turn, is received by a part 205 fixed to the generally central portion of the frame member 201. The bracket 202 is fixed to a cross channel 206 welded to the lower edges of the side members 91 and 92, and each of the latter carries a pair of guide angles 207 which are welded to the conveyor frame in depending relation and form guide slots S receiving the end portions of the axle 201 and constrains the latter for limited substantially vertical rocking about the pivot 204. The front end of the axle 201 is formed to extend upwardly and forwardly, as indicated at 208, and carries a generally vertically disposed but rearwardly angled sleeve section 209 in which the upper end 211 of a front caster wheel spindle member 212 is disposed. A caster wheel 213 is mounted on the lower end of the spindle member 212 and the latter is freely swingable within the sleeve section 209 about a generally vertically disposed and rearwardly inclined axis. The rear end of the axle member 201 is formed similarly to the front end, having an upwardly and rearwardly extending section 217 to the rear portion of which a generally vertically disposed sleeve section 218 is fixed in a downwardly and rearwardly extending position, being at substantially the same angle as the forward sleeve section 209, relative to the horizontal. A rear caster wheel spindle member 219 carrying a rear caster wheel 221 is disposed for free rocking movement within the rear sleeve section 218. The caster wheel spindle members 212 and 219 may be identical, if desired.

An upwardly extending arm 225 is fixed at its lower end, as by welding, to the rear portion of the caster wheel axle member 201, the latter being rockable about a generally fore and aft extending axis relative to the conveyor frame support bracket 202. The upper end of the arm 225 carries a pair of upwardly extending arms 226 which are apertured at their upper ends to rockably receive a swivel member 228 through which the outer end of a link 229 extends. The end of the link 229 is threaded to receive a pair of lock nuts 231 which normally are tightened against the swivel member 228. The inner end of the link 229 is pivotally connected, as at 231, to a bracket 232 that is fixed to the rear arm 122 of the bail member 123.

In the form of the invention shown in Figures 7–9, the adjusting linkage 127 (Figure 4) is omitted and, instead, the conveyor stabilized relative to the plow frame 11 by means of an upper link member 236 which includes two threaded rod sections 237 and 238 interconnected by a turnbuckle adjustment 239. The outer end of the rod 238 is pivoted, as at 241, to a brace member 242 which forms a part of the conveyor frame 12, and the outer end of the other link member 237 is pivotally connected, as at 243, to a bracket 244 that is fixed in any suitable manner to the rear portion of the plow frame 11. The inner end of the conveyor frame 12 is raised and lowered relative to the plow frame 11 by linkage which in detail is substantially like the crank screw device 126 and associated parts, as shown in Figure 4. In Figure 7, this adjusting linkage is indicated by the reference numeral 126a. The pivots 241 and 243 of the stabilizing link 236 are so arranged relative to the pivots 118 and the axis of pivotal support of the bail member 123 on the plow frame 11 that when the linkage 126a is adjusted to raise and lower the inner end of the conveyor unit relative to the plow disk 125 the conveyor as a unit is moved relative to the plow frame about a virtual pivot axis which is disposed substantially below but in the vertical fore and aft extending plane passing through the points of contact of the front and rear caster wheels 213 and 221 with the ground. Specifically, as will be seen from Figure 7, the members 236 and 123 constitute upper and lower links, and the axis of pivotal connection between the bail 123 and the members 114 is spaced generally vertically below the axis of the pivot 243 a greater distance than the spacing between the axes of the associated pivots 118 and 241, the pivots 118 and 241 being disposed below the pivot 243 and the associated bail axis just mentioned. Thus, as shown in Figure 7, lines passing through the four pivot axes intersect, when extended, substantially well below the caster wheels 221, which establishes the virtual pivot axis of the conveyor unit as mentioned above. The conveyor frame 12, holds the plow frame in upright position at all times irrespective of whether the inner end of the conveyor unit is raised or lowered relative to the adjacent plow disk 125, and the link 229 connects the caster wheel support axle 201 (Figure 9) with the plow frame through the bail member 123, whereby the caster wheels are held in a generally upright position in the different positions of the bail member 123 relative to the plow frame.

While we have shown and described above the preferred structure in which the principles of the present invention have been incorporated, it is to be understood that our invention is not to be limited to the particular details, shown and described above, but that, in fact, widely different means may be employed in the broader aspects of our invention.

What we claim, therefore, and desire to secure by Letters Patent is:

1. A terracing machine comprising a generally fore and aft extending plow frame, a plow element carried by said frame, a bail member swingably connected at its central portion with said plow frame for generally vertical movement relative thereto and having side arms extending laterally outwardly away from said plow frame generally on opposite sides of said plow element, a generally laterally extending conveyor frame connected at its inner end with the laterally outer end of said bail side arms, means acting between the plow frame and one of said bail arms for swinging said bail generally vertically to raise and lower the inner end of said conveyor, and ground wheel means supporting the outer end of said conveyor frame.

2. A terracing attachment adapted to be connected to a disk plow having a plow beam and a rear furrow wheel generally vertically adjustable relative to the rear end of said plow beam, said terracing attachment comprising a bail member, means swingably connecting the central portion of said bail member with said plow beam, a conveyor swingably connected with the end portions of said bail member, means fixing said bail member to said plow frame to hold said bail member against swinging movement, and means fixing the laterally inner portion of said conveyor frame to said bail member to prevent movement between said bail member and said conveyor frame.

3. A terracing attachment adapted to be connected to a disk plow of the type including a generally fore and aft extending plow frame, a plow element carried thereby, and ground wheel means for supporting at least a rear portion of said plow frame, said terracing attachment comprising a bail member having a central portion and fore and aft spaced, laterally extending side arms, means swingably connecting the central portion of said bail member to said plow frame with the side arms generally on opposite sides of said plow element, a conveyor frame disposable transversely relative to the plow frame, means swingably connecting the laterally inner end of said conveyor frame to the laterally outer portions of said bail side arms, and ground wheel means connected with the laterally outer portion of said conveyor frame for supporting said laterally outer portion thereof.

4. A terracing machine comprising a generally fore and aft extending plow frame, a plow element carried by said frame, a generally laterally extending conveyor frame connected at its inner end with the plow frame for generally vertical movement relative thereto about a generally fore-and-aft extending axis, ground wheel means supporting the outer end of said conveyor frame and connected with the latter so as to swing generally about a fore and aft extending axis, and link means connected at one end with said ground wheel means at a point spaced generally vertically relative to the axis about which said ground wheel means is movable relative to the conveyor frame, said link means also being connected with said plow frame, whereby said link means reacts against said plow frame so as to hold the ground wheel means generally in an upright position in the different positions of said conveyor frame relative to said plow frame.

5. A terracing machine comprising a generally fore and aft extending plow frame, a plow element carried by said frame, a bail member swingably connected at its central portion with said plow frame and having side arms extending laterally outwardly away from said plow frame generally on opposite sides of said plow element, a generally laterally extending conveyor frame connected at its inner end with the laterally outer end of said bail side arms, ground wheel means supporting the outer end of said conveyor frame and swingably connected with the latter for movement relative thereto about a generally fore and aft extending axis, and link means extending between said bail and said ground wheel means for holding the latter in a generally upright position in the different positions of said bail member relative to said plow frame.

6. The combination with a disk plow of the type including a generally fore and aft extending frame and a plow element carried by the latter, of a terracing attachment comprising a generally laterally extending conveyor frame, ground wheel means carrying the laterally outer portion of said conveyor frame and swingable relative to the latter about a generally fore and aft extending axis, means connecting the laterally inner portion of said conveyor frame with said plow frame so that the plow frame and the conveyor frame are so interconnected that each frame is held against lateral tilting relative to the other, means raising and lowering the inner portion of said conveyor frame relative to said plow frame, and means interconnected with said raising and lowering means and with said laterally swingable ground wheel means for maintaining the latter in generally upright position in the different positions of the inner portion of said conveyor frame relative to said plow frame.

7. A terracing attachment adapted to be connected to a disk plow of the type including a generally fore and aft extending plow frame, a plow element carried thereby, and ground wheel means for supporting at least a rear portion of said plow frame, said terracing attachment comprising a bail member having a central portion and fore and aft spaced, laterally extending side arms, means swingably connecting the central portion of said bail member to said plow frame with the side arms generally on opposite sides of said plow element, a conveyor frame, means swingably connecting the laterally inner end of said conveyor frame to the laterally outer portions of said bail side arms, and adjustable link means connecting the inner portion of said conveyor frame with said plow frame so that the inner end of the conveyor may be raised and lowered relative to the plow frame.

8. A terracing machine comprising a generally fore and aft extending plow frame, a plow element carried thereby, a rear furrow wheel connected with the rear portion of said plow frame, a laterally disposed conveyor unit including a conveyor frame, ground wheel means connected with and supporting the laterally outer end of said conveyor frame, means connecting the laterally inner end of said conveyor frame with said plow frame adjacent said plow element comprising a pair of non-parallel links pivotally connecting the inner end of said conveyor frame with said plow frame, the pivot axes of said links at their inner ends being generally above and spaced farther apart vertically than the pivot axes of said links at their laterally outer ends, whereby lines extending through the upper and lower pivot axes intersect generally vertically below said ground wheel and thereby form at said intersection a virtual pivot axis about which the conveyor frame moves relative to the plow frame when the inner end of the conveyor frame is raised and lowered relative to the plow frame, and means connected between said frame and at least one of said links for adjustably holding said links against movement relative to said plow frame.

References Cited in the file of this patent

UNITED STATES PATENTS

| Number | Name | Date |
|---|---|---|
| 185,500 | Cappock | Dec. 19, 1876 |
| 379,705 | Kuhlman | Mar. 20, 1888 |
| 623,395 | Cornett | Apr. 18, 1899 |
| 759,606 | Gray | May 10, 1904 |
| 1,471,887 | Dorney et al. | Oct. 23, 1923 |
| 1,933,485 | Rund et al. | Oct. 31, 1933 |
| 1,981,170 | Green et al. | Nov. 20, 1934 |
| 2,089,319 | Wooley et al. | Aug. 10, 1937 |
| 2,199,239 | Griffith et al. | Apr. 30, 1940 |
| 2,248,709 | Jarmin | July 8, 1941 |
| 2,514,780 | McGovern | July 11, 1950 |